United States Patent
Worms

(10) Patent No.: US 7,310,935 B2
(45) Date of Patent: Dec. 25, 2007

(54) ENERGY GUIDING DEVICE WITH REDUCED FRICTION FORCES

(75) Inventor: Jean Jack Worms, Saint Mande (FR)

(73) Assignee: Kabelschlepp GmbH, Siegen (DE)

( * ) Notice: Subject to any disclaimer, the term of this patent is extended or adjusted under 35 U.S.C. 154(b) by 226 days.

(21) Appl. No.: 10/501,596

(22) PCT Filed: Jan. 9, 2003

(86) PCT No.: PCT/EP03/00139

§ 371 (c)(1),
(2), (4) Date: Mar. 4, 2005

(87) PCT Pub. No.: WO03/060346

PCT Pub. Date: Jul. 24, 2003

(65) Prior Publication Data

US 2005/0155337 A1   Jul. 21, 2005

(30) Foreign Application Priority Data

Jan. 18, 2002 (FR) .................................. 02 00607

(51) Int. Cl.
*F16G 13/16* (2006.01)
*H02G 11/00* (2006.01)

(52) U.S. Cl. .......................... 59/78.1; 248/49; 248/51

(58) Field of Classification Search .............. 59/78.1; 248/49, 51
See application file for complete search history.

(56) References Cited

U.S. PATENT DOCUMENTS

| 4,129,277 | A | * | 12/1978 | Tenniswood | 248/51 |
| 4,462,565 | A | * | 7/1984 | Johnson | 248/51 |
| 4,600,817 | A | * | 7/1986 | Hackenberg | 59/78.1 |
| 4,789,120 | A | * | 12/1988 | Spidel | 248/49 |
| 5,178,247 | A | * | 1/1993 | Vagaggini | 59/78.1 |
| 5,649,415 | A | * | 7/1997 | Pea | 59/78.1 |
| 6,612,104 | B2 | * | 9/2003 | Blase | 59/78.1 |

FOREIGN PATENT DOCUMENTS

| EP | 0 725 228 A1 | 7/1996 |
| EP | 1 193 420 A1 | 3/2002 |
| JP | 10-220533 | 8/1998 |

\* cited by examiner

*Primary Examiner*—David B Jones
(74) *Attorney, Agent, or Firm*—Smith Law Office

(57) ABSTRACT

For reducing the friction of forces during the movement of an energy routing device (7), it is suggested that at least one movable central appliance (16) be arranged between the carrying side (15) and the returning side (9), and that the central appliance be in an effective connection with the carrying side, so that during the effective connection, the central appliance is moved solely by the carrying unit.

23 Claims, 4 Drawing Sheets

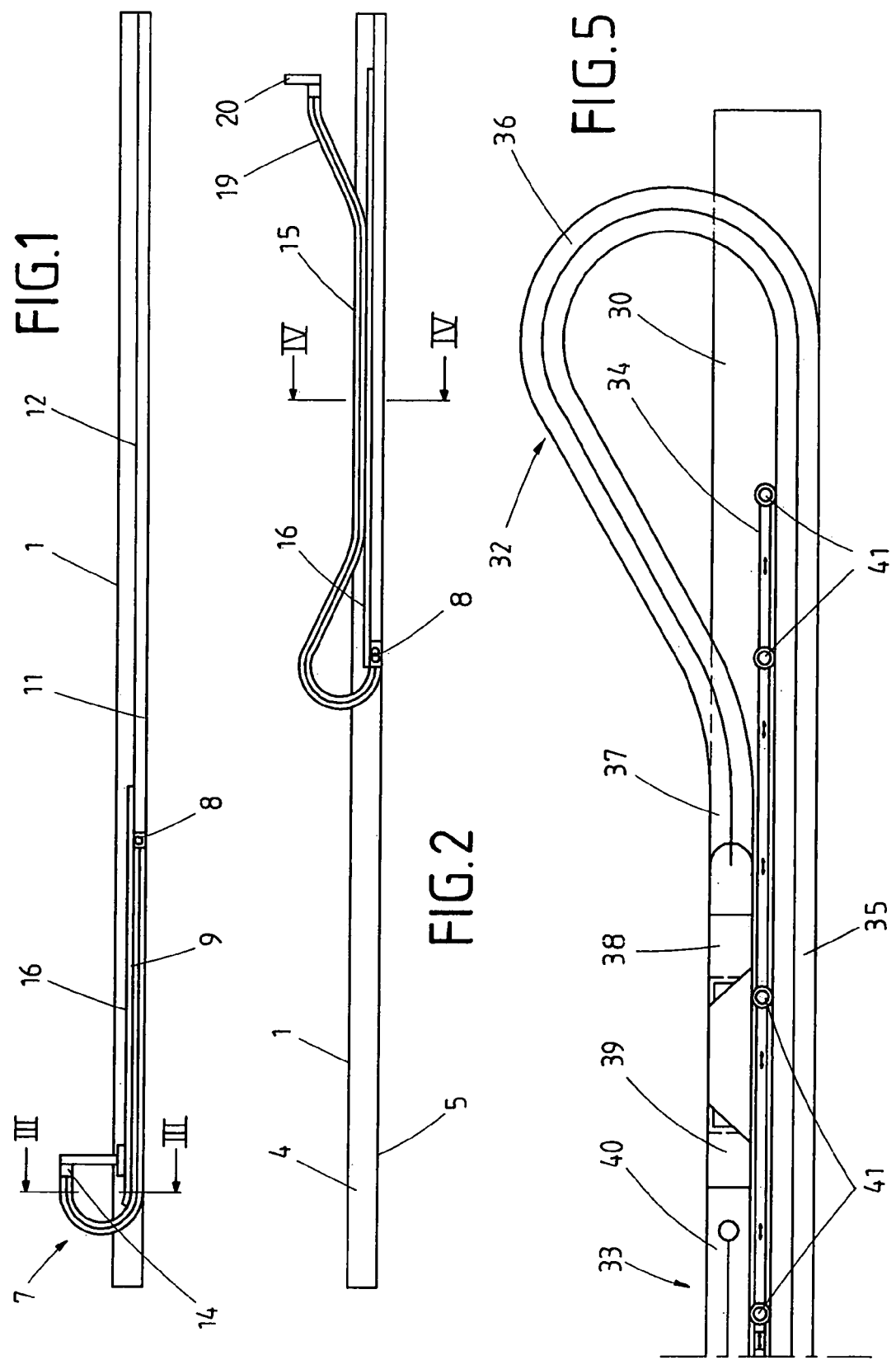

Figure 7:
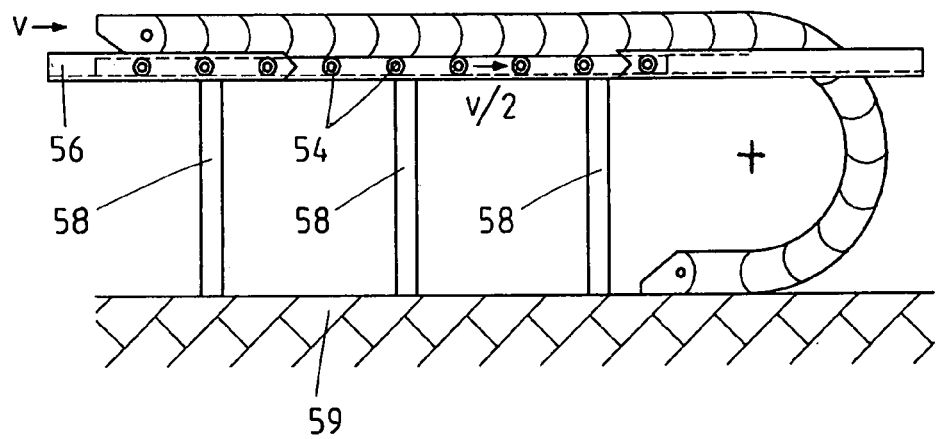

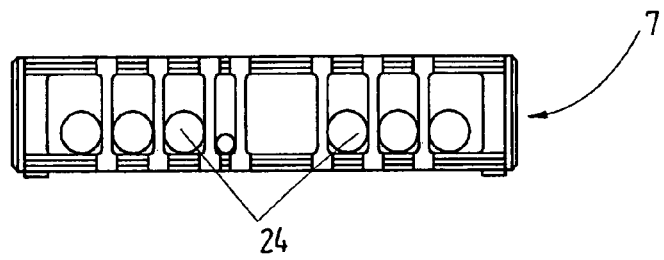
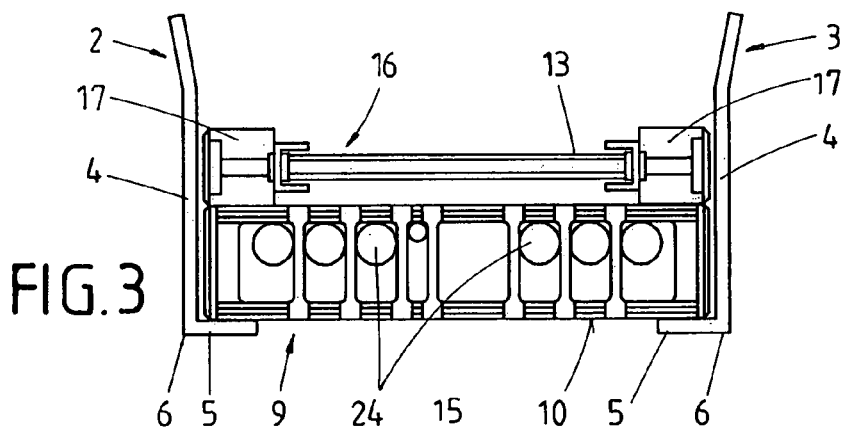
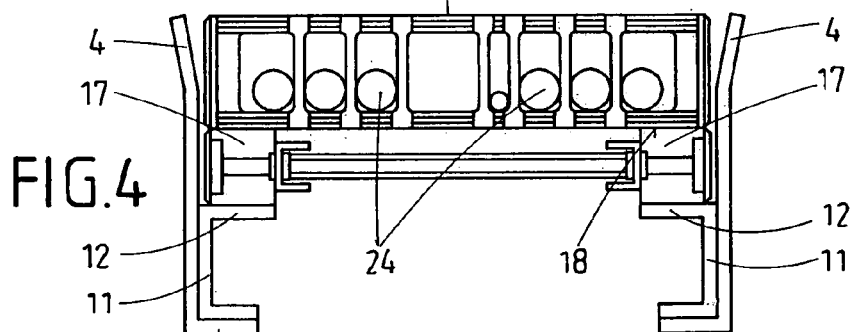
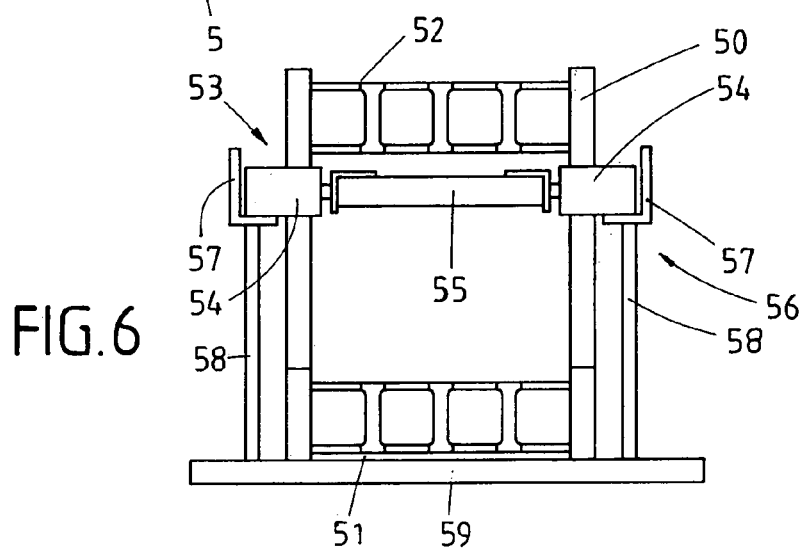

ENERGY GUIDING DEVICE WITH REDUCED FRICTION FORCES

The subject matter of the invention is an energy routing device which has at least one energy routing chain composed of attached links that are linked one under the other around vertical axes to the longitudinal direction of the energy routing chain.

Energy routing chains are used in the most diverse apparatuses, machines, and devices, especially where it is necessary to transport energy via cables, tubes and the like from a fixed-location outlet to a user's movable outlet. The energy routing chain can include one single chain or several chains in which the cables, tubes and the like are guided.

In the case of very long processing distances, there is the problem that because of the weight of the energy routing chain as well as the weight of the cables and the tubes, the energy routing chain or chain links are subject to great demands.

This is especially the case when a carrying side of the energy routing chain slides on the return side so that a large amount of friction develops between them, thereby leading on the one hand to a fast erosion of the chain, and on the other hand, leading to a resistance of the motion, in which the force or energy required to move the energy routing chain increases and which poses the danger of causing a break in the chain or at the attachment points. These problems have already been recognized.

So it is known that sliding shoes arranged on at least some of the links of the energy routing chain can reduce the friction between the parts of the carrying parts that are rubbing against each other.

Through the EP 0 725 228 A1 an energy routing device is known which is composed of at least one energy routing chain attached to links that are linked one below the other around vertical axes to the longitudinal direction of the energy routing chain, in which a first end of the energy routing chain is attached to a fixed location and the second end is movable at least in the longitudinal direction. Between the carrying side and the returning side of the energy routing chain is a transfer car equipped with wheels, where the wheels are suitable for rolling simultaneously on the top side of the returning side and on the bottom side of the carrying side.

For a synchronized movement of the transfer car with the movable end of the energy routing chain, the transfer car is equipped with a pulley at each opposing end. The movable outlet, which is connected with the movable end of the energy routing chain is connected with the cable pair. One cable is led over one pulley to one end, and the other cable is led over a further pulley to the opposite end of the transfer car. The ends of the cables are fixed at the fixed-location outlet of the energy routing chain.

By moving the movable outlet, the transfer car is moved through one or more cables.

Through the EP 1 193 420 A1 issued on Apr. 3, 2002, an energy routing device is known which consists of two energy routing chains of joined links which are linked below each other around vertical axes to the longitudinal direction of the energy routing chain, and where the first ends of the energy routing chain are fixed and the second ends of the energy routing chain are movable. Between the carrying side and the returning side there is a sled with wheels. The sled is moved over the cables which are connected to the movable outlet of a motor.

The construction requirements and the labor required to assemble the energy routing device as described in the EP 0 725 228 A1 or in the EP 1 193 420 A1 is quite large.

In addition, it is always necessary to make sure that the cords or cables necessary for moving the transfer car do not jump out of the pulleys, as these cables could lead to the destruction of the energy routing device.

Based on this, it is the objective of the present invention to reduce the operating losses and in particular to increase the operating security of the energy routing device. A further objective of the invention is to reduce the construction and assembly labor.

This task or objective is achieved by the invented energy routing device. Further advantageous features and designs are the subject matter of the sub-claims.

The invented energy routing device has at least one energy routing chain of joined links. The links of the energy routing chain are linked under each other around vertical axes to the longitudinal direction of the energy routing chain.

A first end of at least one energy routing chain is attachable to a fixed location. The second end of the at least one energy routing chain is movable in the longitudinal direction.

The energy routing chain has a carrying side and a returning side, which are connected to each other in an arch-shaped area, the curvature area. The length of the carrying side or the returning side is dependent on the position of the movable second end in relation to the fixed first end.

Arranged between the carrying side and the returning side is at least one central appliance which can be moved back and forth in the longitudinal direction. The central appliance has an effective connection with the carrying side so that during this effective connection, the central appliance is moved solely by the carrying side. Preferably one section of the carrying side lies on the central appliance, so that through the movement of the carrying side the central appliance is moved correspondingly. The central appliance moves here at half the speed at which the carrying side moves.

In this invented version of the energy routing device a higher operational security is achieved, since it results in a passive moving of the central appliance. The construction labor as well as the assembly labor of the invented energy routing device is reduced to a very small scale.

In the effective connection between the carrying side and the at least one central appliance there is a preferably frictional connection.

The central appliances are arranged between the two energy routing chains. In such a configuration it is not necessary that the central appliances have a return motion device. The central appliances can have however at least one return motion device.

For reducing the friction and thus for reducing the operating loss, it is suggested that in an advantageous design for the energy routing device, the central appliances should have rolling elements. These rolling elements are preferably wheels and/or rollers.

For simplifying the assembly of the central appliances, it is suggested that at least two rolling elements be connected to one another by a rigid axle. Preferably at least the rolling elements are made from at least one plastic material. If the rolling elements are connected by a rigid axle, then the axle and the rolling elements can be manufactured in one piece out of plastic. These can be manufactured in an injection molding process. Since the rigid axle and the rolling elements have different functions, it can be effective to apply a covering or coating on the surface of the rolling components which can reduce the friction and/or have low noise. The application of the covering or the layering can be undertaken according to the two-component injection process.

The rolling elements can be arranged directly between the carrying side and the returning side of the energy routing chain. The preferred version of the invention however has the rolling elements connected with at least one truss. The truss can be made out of metal or plastic. Preferably the truss is shaped from at least one profile. Preferably the rolling elements are detachably attached to the trusses. The detachable attachment is done in such a way, however, that the rolling elements are captively attached to the trusses.

A preferred version of the energy routing device according to the invention is one in which the rolling elements and/or at least some links are designed such that these promote the effective connection between the at least one central appliance and the energy routing chain. Here, the rolling elements and/or at least several links can be designed so that they have features or structures that interlock, which results in that the central appliance follows the movement of the carrying side.

For a further advantageous embodiment of the energy routing device it is suggested that the central appliance, especially the rolling elements, be suitable for moving at least on the bottom side of the carrying side. This enables a relatively compact assembly of the energy routing device.

For avoiding high local pressure in the returning side, it is suggested that the central appliances be directed in at least one guiding duct running in the longitudinal direction of the energy routing chain. This procedure makes it possible to utilize energy routing chains that use chain latches which have only a minimal thickness. In addition, energy routing chains made of relatively soft plastic can be produced.

Through the equipping with a duct, it becomes possible to reduce the slack of the carrying side, which can be useful if there are installations between the carrying side and the returning side.

The duct is preferably formed from at least one duct profile. The duct profile can have various geometrical shapes. It is especially preferable if the design of the duct profile in cross-section is substantially L-shaped or U-shaped. This hereby enables a sideways guidance of the central appliance.

A suggested further advantageous embodiment of the energy routing device is that the central appliances have at least one return motion device which can be brought into contact with the inner side of the curvature area of the energy routing chain. This measure has the advantage that the central appliance follows the movement of the carrying side, even though the efficient connection between the central appliance and the carrying side is no longer, or only very little developed through the lying placement of at least one section of the carrying side on the central appliance, so that the central appliance without the return motion device would barely or not at all follow the movement of the carrying side. Such a constellation can occur especially when during a one-sided arrangement of the energy routing chain the movable connection of the energy routing chain is in the end position or goes over into the end position, in which the length of the carrying side is minimal or even close to nil.

The central appliance is preferably so formed that it has one return motion device on both ends, so that the installation of the central appliance is simplified. Since it is outfitted with return motion devices on both ends, there is no preferred installation direction of the central appliance which leads to greater operating security. In addition, the arrangement of two return motion devices has the advantage that these can work together with the energy routing chains arranged counterdirectional to the respective curvature area.

If the central appliance has at least one return motion device, then a further advantageous design of the energy routing device is suggested, namely that the contact occur within the contact area which is substantially at the same height as the center of curvature of the curvature area. This design feature has the advantage that through the curvature area of the energy routing chain a substantially horizontally directed force acts upon the return motion device, so that the disruptive turning and tipping moments can only act upon the return motion device to a very small degree, thereby leading to increased stability and higher reliability of the central appliance.

The return motion device has at least one contact unit. Preferably the contact unit is situated so that it is at least tiltable, and especially turnable.

According to a further advantageous design of the energy routing device, it is suggested that it has two energy routing chains that have their respective first ends adjacent to each other and whose respective second ends can be moved together.

A preferred design of the energy routing device is one including a channel with a floor and two flanks extending in a substantially longitudinally horizontal direction and in which the at least one energy routing chain is guided.

Especially with an energy routing device that has at least one one-sided retractable energy routing chain, it is suggested that the floor of the channel be located in a part of the length of the channel, opposite to the returning side of the first end of the chain, and basically at the same level as the upper side of the returning side; this design creates a substantially continuous route for the central appliance.

Preferably the channel has the guiding duct for the central appliance. The guiding duct is shaped especially by the flanks. It is especially proposed that the flanks be formed correspondingly. The flanks are formed through combining of profiles of final length. They can be manufactured for example by suitably bending metal pieces.

Further details and advantages of the energy routing device according to the invention are described below using the practical examples depicted in the drawings, without limiting the subject of the invention to these preferred practical examples.

Figure 8:
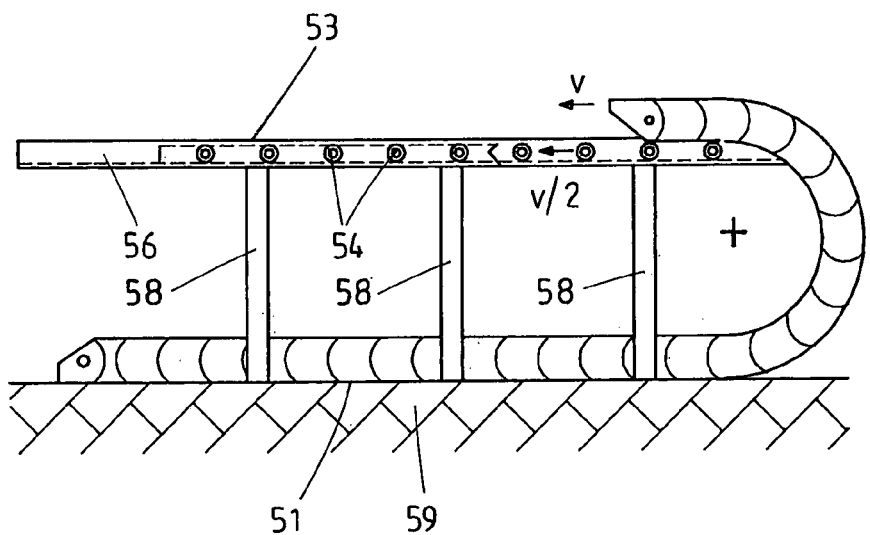
Figure 9:
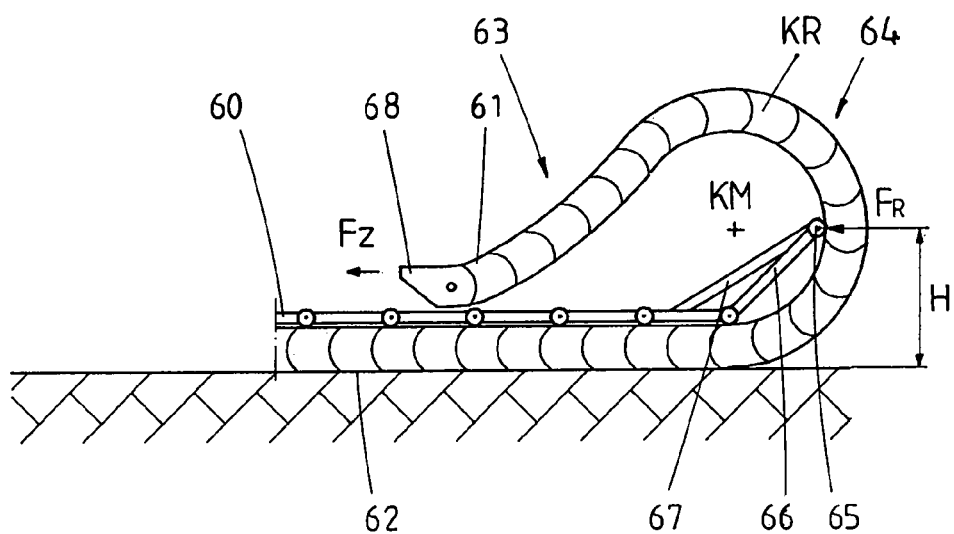
Figure 10:
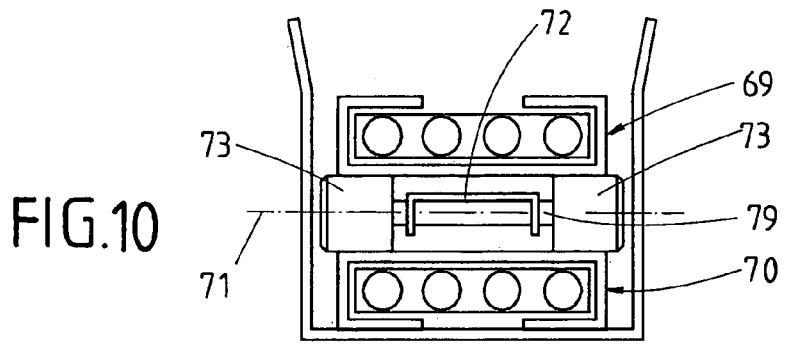
Figure 11:
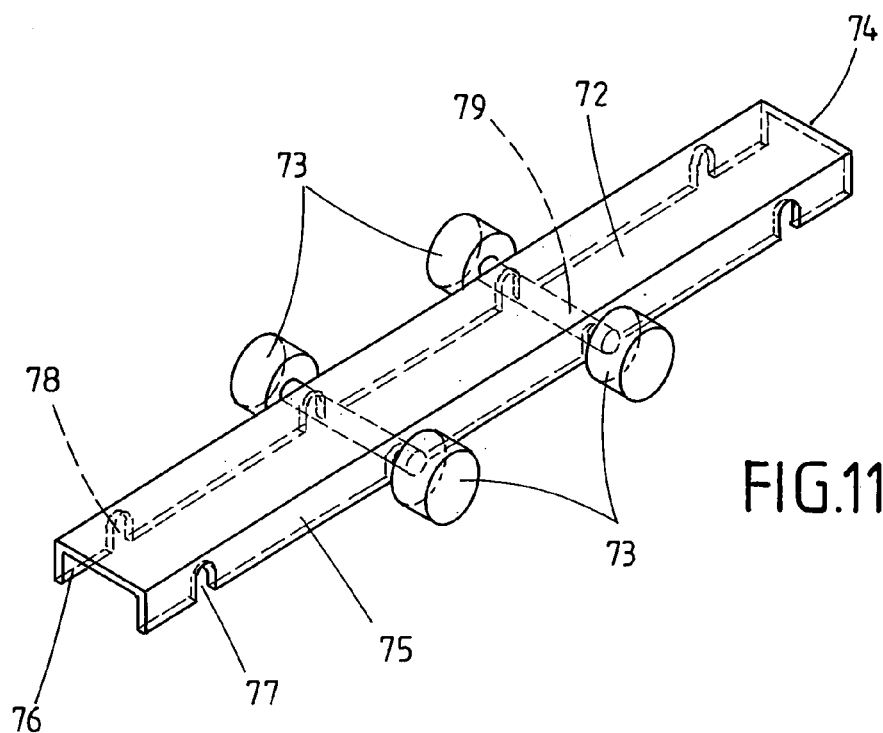
Figure 12:
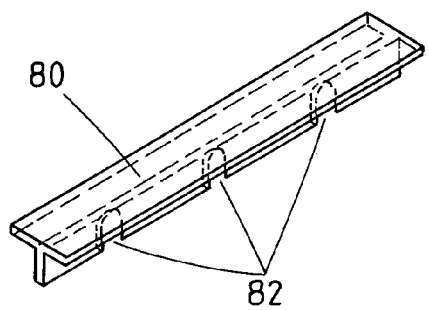
Figure 13:
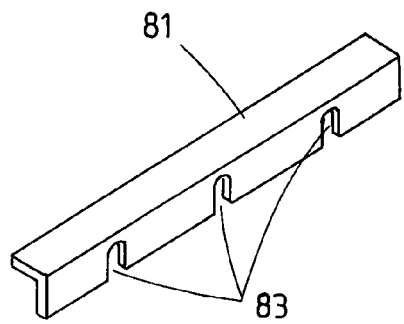

FIG. 1 shows a schematic view of a longitudinal section of an energy routing device with a single chain in an end position of the energy routing chain, FIG. 2 shows an energy routing device according to FIG. 1 in a second end position of the energy routing chain, FIG. 3 shows a cross-section along the cut III-III in FIG. 1, FIG. 4 shows a cross-section along the cut IV-IV of FIG. 2, FIG. 5 shows a schematic partial view of a longitudinal cut of the energy routing device according to the invention with two energy routing chains, FIG. 6 shows a second practical example of an energy routing device in a front view, FIG. 7 shows the energy routing device of FIG. 6 in a side view and in the first position, FIG. 8 shows the energy routing device of FIG. 6 in a side-view and in a second end position, FIG. 9 shows an energy routing device with a return motion device, FIG. 10 shows a further practical example of an energy routing device from the front-view, FIG. 11 shows a truss with rolling elements, FIG. 12 shows a first practical example of a profile of a truss, FIG. 13 shows a second practical example of a profile of a truss.

The energy routing device according to the invention which is represented in FIGS. 1 through 4 has a channel 1 that extends horizontally and which is formed from two side profiles 2 and 3. The side profiles 2 and 3 are shaped symmetrically in the depicted practical example. Every profile 2 and 3 has a transversal L-shaped section and each define a vertical flank 4 and a horizontal rim 5, which stretch from the rim 5 of the opposite flank 4 to the lower edge 6 of the flank 4.

The energy routing device 7 is, with one of its ends, designated 8, on which profiles 2 and 3 are substantially fastened to the half length of the latter, so that an area 9 (returning side) of its length, and to the end 8, its underside 10, as is depicted in FIGS. 1 and 3, can rest on a rim 5 defining the floor of a channel between the end 8 and the left end as in FIG. 1.

As can be seen in FIG. 4, the channel has additional profiles 11 arranged above the rim 5. These form a high-lying floor 12 of the channel 1 that lies at the same level as the upper side 13 of the returning side 9 of the energy routing chain 7.

FIG. 1 shows the movable end 14 of the energy routing chain 7, which is opposite to the fixed-location end 8 that is in an end position lying on the left, and the length of the returning side 9 resting horizontally on the rim 5 is maximal.

Moving from this position, the end 14 can move right longitudinally to the channel 1 to the second end position depicted in FIG. 2, in which the returning side 9 has a minimal expansion, or, depending on the construction, has completely disappeared; the energy routing chain with respect to the rim 5 is completely lifted up.

In the course of this movement, an energy routing chain's carrying side 15 of variable length which is located next to the movable end 14 is affected by its own weight and comes to rest on the returning side and then on the high-lying floor 12.

According to the invention, the carrying side 15 lies on the returning side 9, and/or on the high-lying floor 12 in effective connection with the central appliance 16, which has a fixed truss that extends in the longitudinal direction. Wheels 17 are mounted on the trusses in such a way that they turn around horizontal axes that run vertically to the longitudinal direction of the energy routing chain and which, as a result, are parallel to the link axes of the links (not individually depicted here) of the energy routing chain 7.

The wheels 17 can on the one hand roll on the upper side 13 of the returning side 9 of the energy routing chain and/or on the high-lying floor 12; on the other hand they can roll on the under side 18 of the carrying side 15, in which case they drive the central appliance 16 in a longitudinal movement at a constant speed of half the speed of the movement of the movable end 14 of the energy routing chain 7.

In the depicted practical example the wheels 17 are mounted in pairs; they have a common rotational axis, and the wheels 17 of a pair are adjacent to both flanks of the channel to form a sideways guidance duct of the sled between the flanks. The length of the central appliance is about half the length of the channel 1 and it is situated somewhat below the energy routing chain, so that the total length of the carrying side 15 can be accommodated in all positions of the energy routing chain. The central appliance is then substantially situated in the left half of the length of FIG. 1, and in its right half in FIG. 2.

In FIGS. 3 and 4, there are schematic depictions of cables, cords and the like 24, which cross through the receivers formed in the links of the energy routing chain 7 in a basically familiar manner, to be led along the energy routing chain 7, from one end (8, 14) to the other.

FIG. 5 shows a second practical example of the invented energy routing device. The energy routing device has two energy routing chains 32, 33, which are arranged opposite each other. The device has a channel 30. The channel substantially corresponds with channel 1, where channel 30 has no additional profiles forming a high lying floor. The energy routing device has central appliances 34.

An end—not depicted—of each chain 32, 33 is fixed in the familiar manner in the channel 30, at a position that is essentially half the length to this. A returning side of the energy routing chain 32 stretches horizontally to the right in FIG. 5, and where the bottom sides rests on the horizontal floor. On the right end of the returning side 35 the energy routing chain 32 bends upwards and then to the left in the curvature area 36, before it is moved by the carrying side to a horizontal area 37 which is adjacent to its second end 38.

The energy routing chain 32 follows a route that is analogous to that of the energy routing chain 32, but one which is directed in the opposite direction; however, only its most movable end 39 and a part of the carrying side 40 are depicted in FIG. 5. The movable ends 30 and 39 of both energy routing chains are movable together in the longitudinal direction of the energy routing device.

In the position depicted in FIG. 5, there are the ends 38 and 39 in the vicinity of the right end of the channel 30 and of the curvature area 36, and above the horizontal lower area 35 of the energy routing chain 33.

When the ends 30 and 39 move to the left in FIG. 5, then the corresponding curvature 36 of the chain 33 also moves left. The returning side 35 and the carrying side 40 become shorter, while the carrying side 37 and the returning side—not represented here—the chain 33 becomes longer.

Number 34 refers to a central appliance whose wheels 41 roll on the top sides of the returning side of the energy routing chains 32, 33 and on the lower sides of the carrying sides 37 and 40. Here the energy routing chains lie in all their positions on the central appliance 34. The carrying side 37 and/or the returning side 40 always lie on the central appliance 34 over a length which is sufficient to transmit a movement to the central appliance.

In comparing FIGS. 1 and 2 with FIG. 5 it can be seen that in the first case, the movable end 14 of the energy routing chain is located at a higher level than the carrying side and is connected to it through a descending area 19, while the ends 38 and 39 are located on the same level as the carrying sides 37 and 40 and each is adjacent to it. It is also possible to position the carrying side of a single chain at the level of the carrying side and to position the movable ends of two chains on a higher level of a shortened arm 20.

FIG. 6 shows a further practical example of the invented energy routing device. The energy routing device has an energy routing chain 50. The energy routing chain has a returning side 51 and a carrying side 52. Between the carrying side 52 and the returning side 51, there is a central appliance that is movable back and forth in the longitudinal direction of the energy routing chain 50. The central appliance 53 has an effective connection with the carrying side 52, so that the central appliance 53 can be moved just by the carrying side 52 during the duration of the effective connection.

The central appliance 53 has rolling elements 54 which are connected to a truss 55. The connection between the rolling elements 54 with the truss 55 is such that the rolling elements can be freely turned.

As can be seen in FIG. 6, the central appliance 53 is led into a guiding duct 56 that runs longitudinally to the energy routing chain. The guiding duct 56 is formed by the duct profiles 57. In the depicted practical example the duct profiles have an L-shape. The duct profiles can also have other shapes and forms. There can also be U-shaped duct profiles. The L-shaped duct profile has the advantage that a side routing of the central appliances can also be achieved.

The duct profiles are connected by support rods 58 with a bearing surface 59. In the case of the support rods 58, these are preferably profiles. Instead of support rods, the duct profiles 57 can be attached directly to walls, where available. It is also possible to include, for example, a triangle on which the duct profiles lie. Such a triangle leg can then be connected, for example, with a vertically running wall.

FIGS. 7 and 8 depict a side view of the invented energy routing chain 50 of FIG. 6. In the depiction according to FIG. 7 the energy routing chain has taken up a first end position. In the depiction according to FIG. 8 the energy routing chain has taken up the second end position, in which a carrying side has a minimal expansion. During the movement of the energy routing chain at the speed v, the central appliance 53 moves at half the speed of the energy routing chain.

FIG. 9 shows a central appliance 60 that is arranged between a carrying side 61 and a returning side 62 of an energy routing chain 63. The returning side 62 extends into the curvature area 64. The curvature area 64 has a curvature radius KR.

The central appliance 60 shows a return motion device 65. The return motion device 65 is in contact with the inner side of the curvature area 64.

The return motion device 65 has a contact unit 66 that is at least tiltable, and preferably turnable. As for the contact unit 66, it is preferably at least one roll. This is connected via rods 67 with the central appliance 60. One rod can be used instead of two rods 67.

The contact body 66 is arranged so that the contact between it and the curvature area 64 substantially occurs at the same height H, where the curvature center KM is at the same height H. The contact unit can also lie above the center of the curvature and in such a layout of the return motion device the energy routing chain glides over the contact unit and settles on the central appliance.

If a force $F_z$ is exerted on the movable end 68 of the energy routing chain in the direction of the fixed location outlet—which is not represented in FIG. 9—then substantially horizontally running force $F_r$ is exerted by the curvature area 64 on the contact unit 65. Through this force the central appliance 60 is moved in the direction of the fixed-location outlet.

FIG. 10 depicts a further practical example of an energy routing device according to the invention. The energy routing device of FIG. 10 has substantially the same layout as the device in FIG. 1. A central appliance 71 is arranged between the carrying side 69 and the returning side 70. The central appliance 71 has a truss 72 which is connected with rolling elements 73.

FIG. 11 depicts the central appliance 71. The truss 72 is designed in the form of a U-shaped profile. The base 74 is adjacent to the returning side 69. Legs 75, 76 stretch from the base 74 in the direction to the returning side 70. In the legs 75, 76 recesses 77, 78 are formed; an axis 79 that is connected to the rolling elements 73 extends into each of these. The number and the arrangement of the rolling elements can be chosen according to demand. In the depicted practical example the rolling elements 73 are substantially shaped cylindrically. The rolling elements 73 as well as the axis 79 can be made of one piece. In particular, rolling elements 73 and axis 79 can be manufactured from a plastic material.

FIG. 12 and 13 depict profiles 80, 81 that can make up part of a truss. The profile 80 is formed in a T-shape, whereas the profile 81 is formed in an L-shape. Every profile 80, 81 has inlets 82, or 83 for the reception of an axis of a rolling element.

REFERENCE LIST

1 Channel
2, 3 Side section
4 Vertical flank
5 rim
6 Lower edge
7 Energy routing chain
8 Free end
9 Area
10 Bottom side
11 Profile
12 Higher-lying floor
13 Upper side
14 Movable end
15 Carrying side
16 Central appliance
17 Wheels
18 Bottom side
20 Arm
24 Cables, wiring and the like
30 Channel
32, 33 Energy routing chain
34 Central appliance
35 Returning side
36 Curvature area
37 Horizontal area
38 Second end
39 Movable end
40 Carrying side
41 Wheels
50 Energy routing chain
51 Returning side
52 Carrying side
53 Central appliance
54 Rolling element
55 Truss
56 Guiding duct
57 Duct profile
58 Support rod
59 Bearing surface
60 Central appliance
61 Carrying side
62 Returning side
63 Chain
64 Curvature area
65 Return motion device
66 Contact unit
67 Rod
68 Movable connection 69 Carrying side
70 Returning side
71 Central appliance
72 Truss
73 Rolling element
74 Base
75, 76 legs
77, 78 Recess
79 Axis
80, 81 Profile
82, 83 Recess

The invention claimed is:

1. An energy routing device comprising:
a first energy routing chain of attached links defining a longitudinal direction of the energy routing chain wherein a first end of the energy routing chain is attachable to a fixed location and wherein a second end of the energy routing chain is movable in a longitudinal direction the first energy routing chain having a carrying side and a returning side; and
at least one central appliance movable in the longitudinal direction of the first energy routing chain, the central appliance having an effective connection that is a frictional connection with the carrying side such that the central appliance is moved along solely by the carrying side during the effective connection.

2. The energy routing device of claim 1 wherein the central appliance comprises rolling elements.

3. The energy routing device of claim 2, wherein the rolling elements comprise wheels.

4. The energy routing device of claim 2 wherein the rolling elements comprise rollers.

5. The energy routing device of claim 2, wherein at least two rolling elements are joined together by a substantially rigid axis.

6. The energy routing device of claim 2, wherein the rolling elements are formed of plastic material.

7. The energy routing device of claim 2, and further comprising a truss connected to at least one of the rolling elements.

8. The energy routing device of claim 7, wherein the truss is formed by a structural member having a first leg and a second leg joined at a right angle to the first leg.

9. The energy routing device of claim 2 wherein the rolling elements comprise at least one effective connection element for forming an effective connection.

10. The energy routing device of claim 1 wherein the central appliance is movable on a bottom side of the carrying side.

11. The energy routing device of claim 1, and further comprising:
at least one return motion unit which can be brought into contact with an inner side of a curvature area of the energy routing chain.

12. The energy routing device according to claim 11, wherein the return motion unit contacts the inner side at a height equivalent to a center of curvature of the curvature area.

13. The energy routing device of claim 11, wherein the return motion unit comprises at least one contact unit.

14. The energy routing device of claim 5 wherein the axis and rolling elements are formed of one piece of plastic.

15. An energy routing device comprising:
a first energy routing chain of attached links defining a longitudinal direction of the energy routing chain wherein a first end of the energy routing chain is attachable to a fixed location and wherein a second end of the energy routing chain is movable in a longitudinal direction the first energy routing chain having a carrying side and a returning side;
at least one central appliance movable in the longitudinal direction of the first energy routing chain, the central appliance having an effective connection with the carrying side such that the central appliance is moved along solely by the carrying side during the effective connection; and
at least one guiding duct running longitudinally to the energy routing chain.

16. The energy routing device of claim 15, wherein the guiding duct is formed by a duct profile.

17. The energy routing device of claim 16, wherein a cross-section of the duct profile is substantially L-shaped.

18. The energy routing device of claim 16, wherein a cross-section of the duct profile is substantially U-shaped.

19. The energy routing device of claim 15, and further comprising:
a channel with a floor wherein the floor includes two flanks extending in a substantially longitudinally horizontal direction to the energy routing chain.

20. The energy routing device of claim 19, wherein the channel contains the guiding duct.

21. The energy routing device of claim 19, wherein the floor is located in a part of the channel opposite to the returning side of the energy routing chain, and wherein the floor is at the same level as an upper side of the returning side.

22. The energy routing device of claim 19, wherein the guiding duct is formed by the flanks.

23. An energy routing device comprising:
a first energy routing chain of attached links defining a longitudinal direction of the energy routing chain wherein a first end of the energy routing chain is attachable to a fixed location and wherein a second end of the energy routing chain is movable in a longitudinal direction the first energy routing chain having a carrying side and a returning side;
at least one central appliance movable in the longitudinal direction of the first energy routing chain, the central appliance having an effective connection with the carrying side such that the central appliance is moved along solely by the carrying side during the effective connection; and
a second energy routing chain,
wherein the respective first ends of each energy routing chain are adjacent to each other;
wherein the respective second ends of each energy routing chain may be moved together; and
wherein the central appliance is arranged between the first and second energy routing chains.

* * * * *